(12) United States Patent
Cottet et al.

(10) Patent No.: US 9,193,476 B2
(45) Date of Patent: Nov. 24, 2015

(54) METHOD AND DEVICE FOR AIDING THE MONITORING OF A TURBINE ENGINE OF AN AIRCRAFT

(71) Applicants: AIRBUS OPERATIONS (SAS), Toulouse (FR); AIRBUS (SAS), Blagnac (FR)

(72) Inventors: Jean-Philippe Cottet, Toulouse (FR); Hubert Patris, Metz (FR); Manfred Birnfeld, Blagnac (FR); Philippe Perrin, Toulouse (FR); Stephan Ducarroir, Lagrace-Dieu (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 38 days.

(21) Appl. No.: 14/090,145

(22) Filed: Nov. 26, 2013

(65) Prior Publication Data
US 2014/0145863 A1 May 29, 2014

(30) Foreign Application Priority Data
Nov. 28, 2012 (FR) ...................................... 12 61338

(51) Int. Cl.
*G01C 21/00* (2006.01)
*B64D 45/00* (2006.01)
*B64D 43/00* (2006.01)
*F02C 9/00* (2006.01)

(52) U.S. Cl.
CPC ................ *B64D 45/00* (2013.01); *B64D 43/00* (2013.01); *F02C 9/00* (2013.01); *F05D 2260/80* (2013.01); *F05D 2260/85* (2013.01)

(58) Field of Classification Search
CPC ................................ B64D 45/00; B64D 43/00
USPC .......................................................... 340/971
See application file for complete search history.

(56) References Cited

U.S. PATENT DOCUMENTS

| 5,726,891 A * | 3/1998 | Sisson et al. ................... 701/100 |
| 5,886,649 A * | 3/1999 | Francois ........................ 340/969 |
| 7,053,796 B1 | 5/2006 | Barber |
| 8,384,563 B2 * | 2/2013 | Fernandez ..................... 340/959 |
| 2008/0140268 A1 * | 6/2008 | Todini ............................... 701/3 |

FOREIGN PATENT DOCUMENTS

WO    WO 2006/081334    8/2006

OTHER PUBLICATIONS

French Search Report for FR Application No. 12 61338, dated Aug. 2, 2013, Lyons, Christopher, 2 pages.

* cited by examiner

*Primary Examiner* — Kerri McNally
(74) *Attorney, Agent, or Firm* — Nixon & Vanderhye P.C.

(57) ABSTRACT

A method and device for aiding the monitoring of a turbine engine of an aircraft, which displays on one and the same indicator of a of a display indication elements illustrating as a percentage the engine start progression or the current sub-idle state of the turbine engine, a margin to a limit temperature of the turbine engine, a margin to a maximum temperature of the turbine engine and a margin to a possible failure of the start that is generated by a too low speed increase of the turbine engine.

16 Claims, 3 Drawing Sheets

METHOD AND DEVICE FOR AIDING THE MONITORING OF A TURBINE ENGINE OF AN AIRCRAFT

RELATED APPLICATION

This application claims priority to France Application No. 12 61338, filed Nov. 28, 2012, the entire contents of which is hereby incorporated by reference.

BACKGROUND OF INVENTION

The present invention relates to a method and a device for aiding the monitoring of a turbine engine of an aircraft, in particular of a transport aeroplane, while said turbine engine is in a sub-idle operating phase.

"Sub-idle operation" relates to an operating state of the turbine engine, particularly during the start phase or during recovery after an ill-timed dip below the lowest power ensuring stable operation, for which the turbine engine rotates more slowly than when it is idling.

Generally, to monitor the start or reacceleration towards idle speed of the engines of an aircraft, the aircraft crew is obliged to check several digital and/or analogue parameters simultaneously, which are displayed on various screens or instruments (particularly on a main ECAM page and a secondary engine page). In particular, the crew have to monitor the following in sequence and/or in parallel:
  the opening of the start valve;
  the establishment of the correct air pressure required for start;
  the gradual increase in the speed of the high-pressure (HP) module of the turbine engine, which is monitored using a parameter N2 or N3 which indicates the rotational speed of the HP shaft. For convenience, the speed of the HP module will be denoted generally as N2 hereafter; however, either N2 or N3 is meant indiscriminately, depending on the body number of the turbine engine in question;
  the opening of the HP fuel tap when the HP shaft is rotating at the right speed;
  the actuation of the igniter plug(s);
  the establishment of the correct mass fuel rate of flow for start;
  ignition, which is identifiable by the increase in the gas outlet temperature, which is monitored using a parameter EGT (or "exhaust gas temperature") or TGT (or "turbine gas temperature"). For convenience, the gas outlet temperature will be denoted generally as EGT hereafter; however, either EGT or TGT is meant indiscriminately; and
  the gradual and steady increase in the gas outlet temperature EGT in line with the simultaneous increase in the rotational speed of the HP module, while ensuring that these parameters, and particularly the gas outlet temperature EGT, remain below maximum values set by the engine manufacturer and that the rotational speed of the HP shaft does not stagnate.

To monitor the gas outlet temperature (EGT), most engine manufacturers take into account only a set limit, generally shown in red, which is published in the operating manuals and thus known to the aircraft crew. However, some engine manufacturers add to this a limit which can vary as a function of the speed N2 of the HP module and is generally shown in amber. As a criterion, this temperature limit depending on the rotational speed is closer to the physical reality of the turbine engine; however, the crew cannot memorise it since it changes (and is therefore not published in the operating manuals). This variable limit is taken into account by the warning logics of the turbine engine control unit, but the crew has no means of easily anticipating the sounding of an overheating warning or a start failure and generally simply has to react if the need arises.

In particular, FR-2 821 452 discloses an electronic centralised aircraft monitoring (or ECAM) device which automatically monitors a plurality of systems, including the engines of an aircraft, and informs the aircraft crew of the state of these systems. In a particular embodiment, this monitoring device displays, among other things, the gas outlet temperature EGT and the rotational speed N2 of the high-pressure module of the engines on different screens or different pages.

Furthermore, when in flight and with conventional display means, the distinction between an engine in standard operation and an engine in sub-idle operation is not immediately obvious, instead requiring the careful reading of a number of other particular parameters (in particular the N2 or N3 parameter).

SUMMARY OF INVENTION

The object of the present invention is to overcome the aforementioned drawbacks. Said invention relates to a method for assisting an aircraft crew in monitoring a turbine engine of said aircraft while said turbine engine is in a sub-idle operating phase, in particular during the start phase.

Accordingly, according to the invention, said method is distinctive in that the following operations are carried out automatically and repeatedly in real-time:
a) current values are received both for the rotational speed of the high-pressure module of the turbine engine and for the gas outlet temperature from the turbine engine;
b) a first parameter, indicating, as a percentage, the state of completion of start or the current state of the sub-idle turbine engine (as a percentage difference from the target idle power), is calculated on the basis of at least the current value for the rotational speed of the high-pressure module of the turbine engine;
c) at least one second parameter, indicating a margin with respect to a possible future breach of a temperature limit for the turbine engine, is calculated on the basis of at least the current value for the gas outlet temperature from the turbine engine. A third parameter, indicating a margin with respect to a possible future start failure due to insufficiently quick acceleration, is also preferably calculated on the basis of at least the time derivative of the current value for the rotational speed of the high-pressure module of the turbine engine;
d) a correlation is determined between said first and second parameters on the one hand, and (where appropriate) between said first and third parameters on the other hand; and
e) at least a first, second and third indicating element are displayed on a same gauge of a display means, which elements represent said first, second and third parameters respectively and adhere, among themselves, to the correlations determined in step d).

Thus, owing to the invention, data representing current values for the two main start criteria (the rotational speed N2 or N3 of the high-pressure module of the turbine engine and the gas outlet temperature EGT from the turbine engine) are displayed on one and the same screen, thereby facilitating the reading thereof. For this purpose, the display uses new calculated parameters which are derived mainly from said N2 (or N3) and EGT parameters and which give an indication of the current state of the engine during the sub-idle operating phase, more specifically:
- the state of completion of acceleration, in particular the state of completion of start; and
- the margin with respect to the safeguards envisaged by the engine manufacturer (mainly in terms of temperature, since overheating is the usual consequence of most of the main outages).

Therefore, when looking at the indicating elements displayed, an operator is able to quickly ascertain the state of the engine (rotation, temperature) and thus the characteristics of sub-idle operation, particularly upon start (hung, quick or hot start, etc.) and during an attempt to recover from sub-idle operation.

Moreover, since the indicating elements are updated in real-time and aligned with each other by means of a correlation set out below, the dynamics of said indicating elements show how start is progressing and how serious the impact would be of any unusual behaviour. The crew should pay particular attention particularly when the two indicating elements are rapidly converging.

According to the invention, account is thus taken of a first parameter corresponding to a percentage which varies from 0 to 100%, indicates the difference between the current sub-idle operation point and the target idle power and, where appropriate, also represents engine start progress.

Advantageously, said first parameter P1 is calculated using the following expression:

$$P1=(N2c-N2t0)/(N2ld-N2t0)$$

in which:
- $N2c$ represents said current value for the rotational speed of the high-pressure module of the turbine engine;
- $N2t0$ represents an initial value for the rotational speed of the high-pressure module of the turbine engine; and
- $N2ld$ represents a target value for the rotational speed of the high-pressure module of the turbine engine when idling, that is, at the end of the start phase or of an attempt to recover from sub-idle operation (this target value may be either a value which is set by default or an anticipated value calculated as a function of the environmental conditions of the day).

Preferably, $N2t0$ is assumed to be zero in order to have a reference P1=0 irrespective of the state of the turbine engine. In this particular case, P1 verifies the following relationship:

$$P1=N2c/N2ld.$$

In a first, preferred embodiment allowing, in particular, easy reading, said first, second and third indicating elements correspond respectively to a needle which moves on a dial which is graduated in terms of the percentage to which start is complete, to a first main (lower) movable boundary marker of a first main segment of this dial which represents an overheating limit (possibly accompanied by an auxiliary segment associated with a second overheating limit), and to a second main (lower) movable boundary marker of a second main segment of this dial which represents a hung-start limit.

In this first embodiment, the value P2 is calculated for the first movable boundary marker (overheating boundary marker) on said dial using the following expression:

$$P2=(N2c+k1\Delta\times N2ant+(1-k1)\times\Delta EGTrN2)/N2ld$$

in which, in addition:
- $\Delta EGTrN2$ gives the current margin with respect to the overheating limit, known as the EGT limit, at the current operating point;
- $\Delta N2ant$ indicates an anticipated breach of the overheating limit, or EGT limit, at current dynamics; and
- $k1$ is a coefficient of empirical adjustment between the anticipation term and the current margin term.

The EGT limit taken into account may correspond:
- either to a variable overheating limit EGTlim which depends on the value of N2;
- or to a published set maximum overheating limit EGTmax.

The corresponding segment is displayed in a different colour depending on the EGT limit taken into account, for example EGTlim is displayed in amber and EGTmax in red.

The (for example red and amber) segment(s) thus defined represent(s) the predicted ranges in which the engine would overheat if the start were to continue at the same dynamics. Therefore, the lower extremities of these segments represent the overheating limits having been incorporated into this gauge. In nominal operation, the needle associated with the value of P1 thus needs to be below the lower movable boundary markers associated with the values of P2.

In a first, simplified alternative embodiment, said margin $\Delta EGTrN2$ (used to calculate P2) is calculated using the following expression:

$$\Delta EGTrN2=\Delta EGT1\times N2ld$$

in which $\Delta EGT1$ is the difference, calculated in an orthonormal coordinate system, between the current value for the gas outlet temperature from the turbine engine and the corresponding value for the curve indicating the EGT limit.

Furthermore, in a second alternative embodiment, said margin $\Delta EGTrN2$ is calculated using the following expression:

$$\Delta EGTrN2=\Delta EGT2\times N2ld$$

in which $\Delta EGT2$ is the shortest distance, calculated in an orthonormal coordinate system, between the current operating point and the curve indicating the EGT limit.

Furthermore, advantageously, said value $\Delta N2ant$ (also used to calculate P2) is determined as a function of the margin $\Delta EGTrN2$ and, where this margin $\Delta EGTrN2$ is positive, as a function of the evolution in the gas outlet temperature (EGT) from the turbine engine and in the rotational speed (N2) of the high-pressure module of the turbine engine, as set out below.

In the first, preferred embodiment, a variant can be considered for the calculation of the first movable boundary marker (overheating boundary marker) on said dial. In this variant, the value P2bis is calculated for said lower movable boundary marker of said dial segment using the following expression:

$$P2bis=(N2c+\Delta EGTrN2ant)/N2ld$$

in which $\Delta EGTrN2ant$ is determined in a similar manner to $\Delta EGTrN2$, albeit at an anticipated operating point, which is a forecast at a particular time after the current operating point, assuming that the engine (turbine engine) maintains the same dynamics.

Furthermore, in this first embodiment, the value P3 is calculated for the second main movable boundary marker (hung start boundary marker) on said dial:
- in a first alternative embodiment, using the following expression:

$$P3=P1-k2((dN2c/dt)c-(dN2/dt)min)$$

in which:
- $k2$ is an empirical adjustment coefficient;
- $(dN2/dt)c$ is the current time derivative of N2; and
- $(dN2/dt)min$ is the minimum turn rate specified by the engine manufacturer; and in a second alternative embodiment, using the following expression:

$$P3=P1-k3(T\max-T)(dN2/dt)c$$

in which, in addition:
- k3 is an empirical adjustment coefficient;
- T is a timer of which the laws of evolution are specified by the engine manufacturer; and
- Tmax is the maximum value for the timer, which is specified by the engine manufacturer and characterises the minimum turn rate.

The value P3 is thus calculated for the second main movable boundary marker of the second main segment of said dial (corresponding to the hung-start limit) using the time derivative of N2 (dN2/dt) and threshold values specified by the engine manufacturer. The dial of the gauge displays this second main segment of which the upper movable boundary marker corresponds to the lower movable boundary marker of the first main segment (that is, that known as the overheating segment, associated with the calculation of P2) and of which the lower movable boundary marker is positioned at the value of P3. In nominal operation, the needle associated with the value of P1 thus needs to be above the upper movable boundary marker associated with the value of P3 and, as explained previously, below lower movable boundary markers associated with the values of P2. The second main segment thus corresponds to a nominal operation zone: this is shown in a particular colour, such as green.

Moreover, advantageously, an auxiliary movable boundary marker value is calculated for an auxiliary segment of said dial, which corresponds to a windmill-start limit, and a segment of which the lower movable boundary marker is positioned on this auxiliary value is displayed on the dial of the gauge.

Furthermore, advantageously, each segment of the dial is displayed in a specific colour, and said needle assumes the colour of the segment in which it is positioned.

Moreover, advantageously, an additional value is determined for a percentage to which start is complete, in relation to a fuel valve, and a point of reference is shown on the dial of the gauge, which is positioned on this additional value. This point of reference on the gauge thus indicates the value of P1 at which the fuel is injected.

Moreover, in a second embodiment, said first and second indicating elements correspond respectively to first and second needles which are represented on two concentric dials, namely an outer dial for said first needle and an inner dial for said second needle. The first (outer) needle represents, as in the first preferred embodiment, a percentage to which start is complete, represented by the parameter P1. The second (inner) needle represents the gas outlet temperature EGT, and the scale of the inner dial is variable and can be adjusted repeatedly in real-time such that the overheating limit value, known as the EGT limit, is always at the point at which said first needle meets this inner dial.

Therefore, the accepted positions for the temperature needle (second or inner needle) are those located below the current position of the start needle (first or outer needle). When the two needles are superposed, the overheating limit has been reached, and if the temperature needle overtakes the start needle, the overheating limit has been breached and start must be stopped. Thus, it is very easy to discern a hot start (or a start which is drifting) by looking at the angular displacement and variations between the two needles.

Furthermore, advantageously, in all the embodiments, auxiliary data are also shown on said display means, in particular as text (steps in the start sequence, outages) and in the form of various symbols.

For example, textual data can be displayed in three lines, with:
- a first line indicating the type of start;
- a second line indicating the state of start elements; and
- a third line indicating the current state of the engine.

The present invention also relates to an automatic device for aiding the monitoring of a turbine engine of an aircraft while said turbine engine is in a sub-idle operating phase, in particular during the start phase.

According to the invention, said device is distinctive in that it comprises:
- means for receiving the current values both for the rotational speed of the high-pressure module of the turbine engine and for the gas outlet temperature from the turbine engine;
- means for calculating a first parameter, indicating, as a percentage, the state of completion of start or the current state of the sub-idle turbine engine (as a percentage difference from the target idle power), on the basis of at least the current value for the rotational speed of the high-pressure module of the turbine engine;
- means for calculating at least one second parameter, indicating a margin with respect to a possible future breach of a temperature limit for the turbine engine, on the basis of at least the current value for the gas outlet temperature from the turbine engine;
- preferably, means for calculating a third parameter, indicating a margin with respect to a possible future start failure due to insufficiently quick acceleration, on the basis of at least the time derivative of the current value for the rotational speed of the high-pressure module of the turbine engine;
- means for determining a correlation between said first and second parameters on the one hand, and (where appropriate) between said first and third parameters on the other hand; and
- means for displaying, on a same gauge of a display means, a first, a second and a third indicating element which represent respectively said first, second and third parameters and adhere, among themselves, to said correlations.

The present invention thus relates to the creation and display of new parameters for monitoring an aeronautical turbine engine in a sub-idle operating phase, in particular while starting-up. The purpose of displaying these new parameters is to make the monitoring of a turbine engine start more intuitive and easier, by helping the crew to focus on simple parameters, reduced to a bare minimum and allowing the pilot(s) to have a phase lead over the system. Moreover, by extending this display to all the sub-idle operating phases, and by using different symbols for an engine in standard operation (conventional display) and an engine in sub-idle operation (display according to the invention), the crew can very quickly gain a precise impression of the state of the aircraft, by unambiguously segregating the turbine machines in standard operation from those not able to provide propulsion.

SUMMARY OF THE DRAWINGS

The figures of the accompanying drawings will make clear how the nvention can be carried out. In these figures, identical references denote like elements.

DETAILED DESCRIPTION OF THE INVENTION

Figure 1:
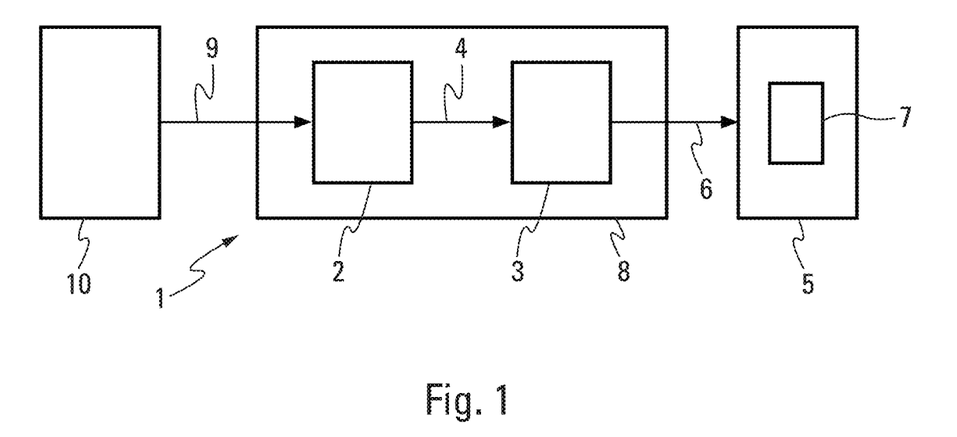
FIG. 1 is a block diagram of a monitoring assistance device according to the invention.

The device 1 according to the invention and shown schematically in FIG. 1 is designed to assist the crew of an aircraft, in particular of a civil transport aeroplane, in monitoring a turbine engine of said aircraft, while said turbine engine is in a sub-idle operating phase, for which the turbine engine rotates more slowly than when it is idling, in particular during the start phase.

For this purpose, said device 1 is automatic and comprises, according to the invention:

means 2 for receiving the current values N2c and EGTc for, respectively, the rotational speed of the high-pressure turbine engine and for the gas outlet temperature from the turbine engine;

calculation means 3 which are connected by means of a connection 4 to said means 2 and formed so as to calculate:

a first parameter P1, indicating the state of completion of start or the current state of the sub-idle turbine engine (as a percentage difference from the target idle power), on the basis of at least the current value N2c for the rotational speed of the high-pressure module of the turbine engine;

a second parameter P2, indicating a margin with respect to a possible future breach of the temperature limit for the turbine engine, on the basis of at least the current value EGTc for the gas outlet temperature from the turbine engine;

a third parameter P3, indicating a margin with respect to a possible future start failure due to insufficiently quick acceleration, on the basis of at least the time derivative of the current value N2c for the rotational speed of the high-pressure module of the turbine engine; and a correlation between said first and second parameters on the one hand, and between said first and third parameters on the other hand; and means 5 which are connected by means of a connection 6 to said calculation means 3 and which are formed so as to display, on one and the same gauge 11, 12 of a display means 7 (more specifically a screen or screen portion), at least a first, a second and a third indicating element which represent respectively said first, second and third parameters and adhere, among themselves, to said correlations.

Thus, the device 1 according to the invention displays, on one and the same gauge 11, 12, described in more detail below, and in real-time, data representing current values for the two main start criteria (the rotational speed N2 of the high-pressure module of the turbine engine and the gas outlet temperature EGT from the turbine engine), thereby facilitating the reading thereof.

More particularly, the display uses new calculated parameters P1, P2 and P3, which are derived mainly from said parameters N2 and EGT and which give an indication of the current state of the engine during the sub-idle operating phase, more specifically:

the state of completion of acceleration, in particular the state of completion of start; and the margin with respect to the safeguards envisaged by the engine manufacturer (mainly in terms of temperature, since overheating is the usual consequence of most of the main outages).

Therefore, when looking at the indicating elements displayed, an operator is able to quickly ascertain the state of the engine (rotation, temperature) and thus the characteristics of sub-idle operation, particularly upon start (hung, quick or hot start, etc.).

Moreover, since the indicating elements are updated in real-time and aligned with each other by means of a correlation set out below, the dynamics of said indicating elements indicate how start is progressing and the severity of any outages. The crew should pay particular attention particularly when the two indicating elements are rapidly converging.

In a particular embodiment, said means 2 and 3 are incorporated within a calculation unit 8 which is connected by means of a connection 9 to conventional means 10 for monitoring a turbine engine. These monitoring means 10 generate, in a conventional manner, the current values N2c and EGTc for, respectively, the rotational speed of the high-pressure module of the turbine engine and for the gas outlet temperature from the turbine engine. The monitoring means 10 may also belong to said device 1.

Moreover, said calculation means 3 calculate said first parameter P1 using the following expression:

$$P1=(N2c-N2t0)/(N2ld-N2t0)$$

in which:

N2c represents said current value for the rotational speed of the high-pressure module of the turbine engine;

N2t0 represents an initial value for the rotational speed of the high-pressure module of the turbine engine; and N2ld represents a target value for the rotational speed of the high-pressure module of the turbine engine when idling, that is, at the end of the start phase or of an attempt to recover from sub-idle operation.

Throughout the description, N2ld corresponds:

either to the predicted value for the environmental conditions of the day and the current state of the engine, if prediction is possible;

or to a minimum value set by default N2minidle. In this case a range 20 representing the idle speed range is preferably provided on the gauge, for example in grey.

Preferably, N2t0 is assumed to be zero in order to have a reference P1=0 irrespective of the state of the turbine engine. Thus, hereafter in the description, P1 verifies the following simplified relationship:

$$P1=N2c/N2ld.$$

The parameter P1 thus constitutes a parameter which is calculated from the value N2c. This parameter P1 represents the state of completion of start with respect to the anticipated value N2ld at the end of start (minimum "idle" value or "idle" value of the day on the basis of environmental conditions).

Said parameter P1 varies from 0% (engine stopped, aeroplane stopped on the ground and N2t0=0) to 100% and, during restart, allows for an indication of the state of completion of this start. It is thus possible to use suitable symbology to show the pilot the zones which are eligible for start, as set out below.

In a particular embodiment, the calculation means 3 are able to multiply said parameter P1 by a value between 0 and 1, as a function of the rotational speed of the fan (or low-pressure module) of the turbine engine (normally denoted N1), to allow for cases in which the low-pressure module is locked ("N1-locked").

Figure 2:
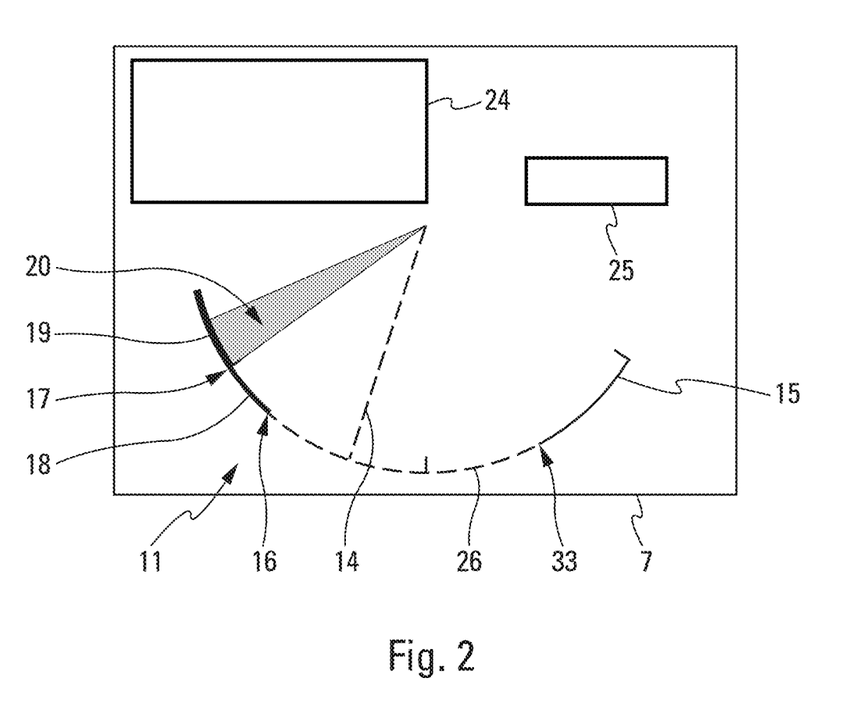
FIGS. 2, 3 and 7 show a display according to a first embodiment of the invention.

In a first, preferred embodiment, shown in particular in FIG. 2 and designed in particular for easy reading, said first, second and third indicating elements of the gauge 11 correspond, respectively, to a needle 14 which moves on a single dial 15 which is graduated in terms of the percentage to which start is complete, to a movable boundary marker 16 (and auxiliary boundary marker 17) of a segment 18 (and auxiliary segment 19) of this dial 15 which represents an overheating limit, and to a movable boundary marker 33 of a segment 26 of this dial 15 which represents a hung-start limit.

The movable boundary markers 16, 17 and 33 thus move on the dial 15 in such a way as to indicate a forbidden zone (segment 18), a precautionary zone (segment 19) and a nominal operation zone (segment 26), as set out below.

The dial 15 is displayed towards the bottom to clearly distinguish the sub-idle operating phase, considered in the present invention, from standard (above-idle) operating phases, which are conventionally displayed towards the top.

Said dial 15 is graduated in %, with points of reference and a segment 20 in the upper portion to indicate which zone is eligible for idling.

Figure 3:
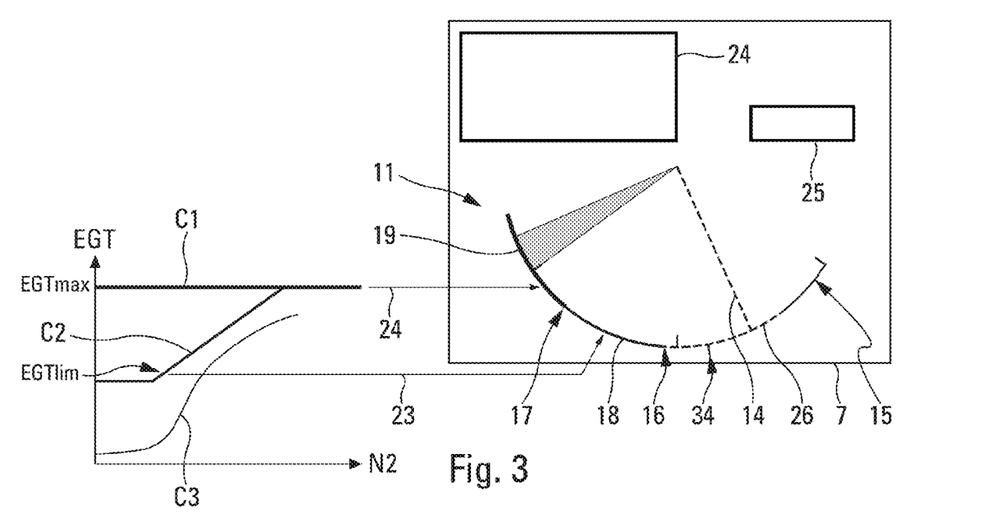
Figure 7:
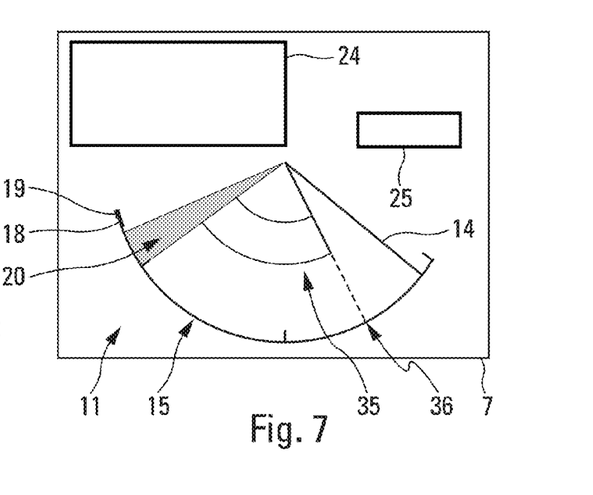

In the preferred example shown in FIGS. 2, 3 and 7, the scale of the dial 15 is graduated in percent from 0% to 115% with three dashes, each corresponding to one of 0%, 50% and 100%. The scale additionally has movable segments of different colours, as set out below.

In this first embodiment, said calculation means 3 calculate the value P2 for the movable boundary marker 16, 17 on said dial 15, using the following expression:

$$P2=(N2c+k1 \times \Delta N2ant+(1-k1) \times \Delta EGTrN2)/N2ld$$

in which, in addition to $N2c$ and $N2ld$:
  $\Delta EGTrN2$ gives the margin with respect to an EGT limit (as set below) at the current operating point;
  $\Delta N2ant$ indicates an anticipated breach of the overheating limit, at current dynamics; and
  k1 is a coefficient of empirical adjustment between the anticipation term $\Delta N2ant$ and the current margin term $\Delta EGTrN2$ which is used to weight the anticipation term with respect to the current margin term to obtain an accurate forecast, taking into account the crew response time.

The EGT limit taken into account may correspond:
  either to a published set maximum overheating limit EGTmax;
  or to a variable overheating limit EGTlim which depends on the value of N2 and which is determined in the conventional manner.

At the very least, a segment 19 is provided on the gauge 11, for which the EGT limit taken into account corresponds to the published set maximum overheating limit EGTmax. Preferably, a second segment 18 is added thereto, for which the EGT limit taken into account corresponds to the variable overheating limit EGTlim depending on the value of N2.

These limits are shown in FIG. 3, which shows (by means of the arrows 23 and 24) the relationship which exists between the curves C2 and C1 (which represent respectively the overheating limits EGTlim and EGTmax as a function of the value of N2) and the corresponding segments 18 and 19 on the gauge 11. In the graph on the left-hand side of this FIG. 3, and in FIGS. 4 to 6 and 8, which show the evolution in EGT as a function of N2 (dimensionless values), the typical actual variation during nominal start has also been reproduced by a curve C3.

The means 5 display the segments 18, 19 in different colours depending on which EGT limit is taken into account, for example amber for EGTlim and red for EGTmax. The colours are shown by means of a standard line and a thick line on the gauge 11 in FIG. 3.

The segments 18 and 19 thus represent the predicted ranges within which the engine would actually or imminently overheat if start were to continue at the same dynamics. Therefore, the lower extremities 16 and 17 of these segments 18 and 19 represent the overheating limits having been incorporated in the gauge 11.

Furthermore, the means 5 display each segment in a specific colour, providing in particular a segment 26 (for example in green) which corresponds to nominal operation, is shown dashed in FIGS. 2 and 3 and of which the lower limit 33 represents the hung-start limit having been incorporated in the gauge 11. The needle 14 assumes the colour of the segment in which it is located.

The following set out the means by which to determine the parameters $\Delta EGTrN2$ and $\Delta N2ant$ which are used to calculate P2. It will be recalled that:
  said parameter $\Delta EGTrN2$ ($\Delta EGT$ resized in relation to N2) represents the margin between the current EGTc value and the EGT limit, for the current $N2c$ value; and
  said parameter $\Delta N2ant$ represents the N2 value at which the current EGTc value would exceed the EGT limit if the engine were to conserve current dynamics. It represents an anticipation factor.

The aim of the parameter $\Delta EGTrN2$ is to reflect the margin with respect to the EGT limit (EGTmax or EGTlim) at the current operating point RP ($N2c$ and EGTc) of the engine.

Figure 4:
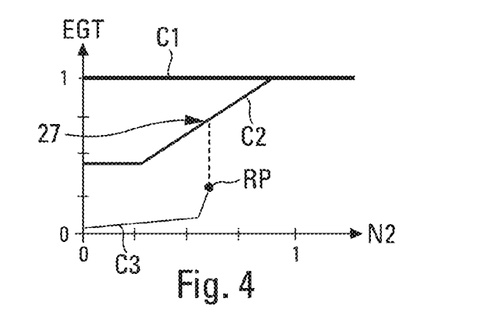
FIGS. 4 to 6 and 8 are graphs for explaining the display characteristics according to said first embodiment.

In a first, simplified alternative embodiment, this margin is calculated as the difference between the EGT limit (EGTmax or EGTlim) and the current EGTc value for EGT (at the point RP, that is, for the current $N2c$ value for N2), as shown in FIG. 4.

Additionally, in this first alternative embodiment, said calculation means 3 calculate said margin $\Delta EGTrN2$ using the following expression:

$$\Delta EGTrN2 = \Delta EGT1 \times N2ld$$

in which $\Delta EGT1$ is said difference between the current EGTc value and the value at point 27 on the curve C2 indicating the EGT limit for the current $N2c$ value, and this in an orthonormal, dimensionless coordinate system (to achieve this, the field EGT, N2 is transformed into a field of reduced, or dimensionless, parameters by dividing the EGT and N2 values by EGTmax and $N2ld$ respectively).

Figure 5:
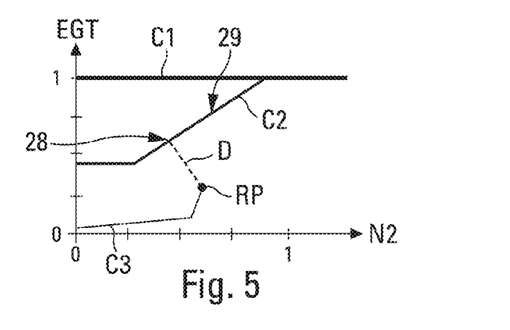

In a second alternative embodiment, the margin $\Delta EGTrN2$ is calculated as the shortest distance D between the current operating point RP and the curve C2 indicating the EGT limit (at a point 28), as shown in FIG. 5.

Additionally, in this second alternative embodiment, said calculation means 3 calculate said margin $\Delta EGTrN2$ using the following expression:

$$\Delta EGTrN2 = \Delta EGT2 \times N2ld$$

in which $\Delta EGT2$ is said shortest distance D between the current operating point RP and the curve C2 indicating the EGT limit in an orthonormal, dimensionless coordinate system (as above).

This distance D is calculated using the conventional mathematical formula, in an orthonormal coordinate system, for calculating the shortest distance between a current operating point RP of coordinates (xRP, yRP) and a straight line (section 29 of C2) defined by the equation:

$$y = ax + by$$

namely:

$$D=|a \times RP - yRP + b|/(\sqrt{1+a^2}).$$

Where the EGT limit curve is a segmented linear function, the calculation principle remains the same, but different zones are defined and formulae that are suited to calculating the distance can be used depending on the zone in which the operating point is located.

In FIGS. 4 and 5, the margin $\Delta$EGTrN2 has been calculated with respect to the curve C2 (EGTlim); it could just as readily have been calculated with respect to the curve C1 (EGTmax).

Moreover, the aim of the parameter $\Delta$N2ant is to introduce an anticipation factor into the calculation of P2, when the EGT value has not yet reached the EGT limit.

When $\Delta$EGTrN2>0, the calculation means 3 calculate the N2 value at which the EGT value will exceed the EGT limit if the engine maintains the same dynamics (that is, assuming the value dEGT/dN2 for the given moment).

Figure 6:
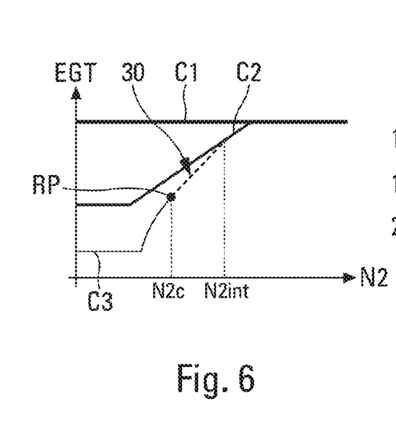

In other words, the calculation means 3 calculate the intersection of the curve C2 (and/or C1) indicating the EGT limit and the tangent 30 from the current operating point RP of the curve C3 indicating the current evolution in EGT as a function of N2, so as to obtain N2$int$, as shown in FIG. 6.

Thus: $\Delta N2ant = N2int - N2c$.

Five different cases depending on the evolution in EGT and N2 should be taken into account when continuously calculating $\Delta$N2ant, namely:

A/ case 1: $\Delta EGTrN2 \leq 0$

Since the margin towards the EGT limit is already negative, there is no point calculating an anticipation factor. In addition, it is assumed that $\Delta N2ant=0$;

B/ case 2: $\Delta EGTrN2 > 0$, $dEGT/dt \geq 0$ and $dN2/dt \geq 0$

The value at the intersection can be determined using the equation below:

$$N2int = (EGTc - N2c \times (dEGT/dN2)c - f)/(d - (dEGT/N2)c$$

in which d and f are taken from the equation y=d.x+f of the curve C2 indicating the EGT limit.

To avoid an infinite value, N2$int$ will be limited to an arbitrary empirical value MaxN2$int$;

C/ case 3: $\Delta EGTrN2 > 0$, $dEGT/dt \geq 0$ and $dN2/dt \leq 0$

The intersection could be calculated but is devoid of sense in anticipation terms. In addition, it is assumed that: $\Delta N2ant=0$;

D/ case 4: $\Delta EGTrN2 > 0$, $dEGT/dt \leq 0$ and $dN2/dt \geq 0$

The intersection could be calculated in some cases but is devoid of sense in anticipation terms. In addition, it is assumed that: $\Delta N2ant=0$; and E/ case 5: $\Delta EGTrN2 > 0$, $dEGT/dt \leq 0$ and $dN2/dt \geq 0$ The intersection cannot be calculated and the EGT value will never exceed the limit if the dynamics remain the same. In addition, a higher value can be foreseen for $\Delta$N2ant. To ensure consistency with case 2, it is assumed that $\Delta N2ant = MaxN2int - N2c$.

Generally speaking, any discrepancies among the various cases above (and cases 4 and 5 in particular) will be eradicated by a decreasing average over a short period of time (known as a "washout").

Moreover, in a particular embodiment, instead of calculating the lower movable boundary markers 16 and 17 (of segments 18, 19) by adding together an anticipation term and a term representing the current margin at the current operating point, as described above, it is possible to calculate the margin with respect to the EGT limit at an anticipated operating point.

Figure 11:
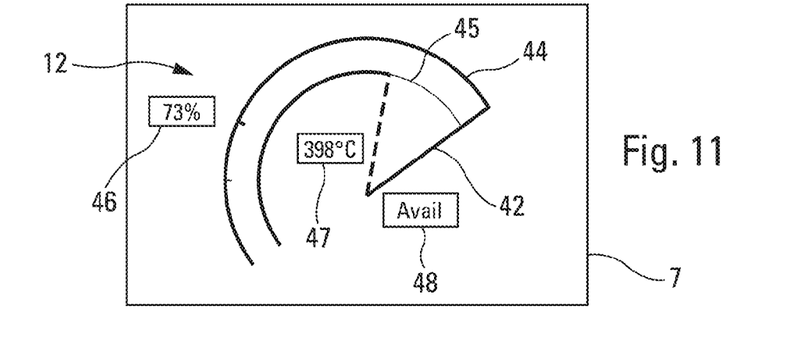

More specifically, in this particular embodiment:

the calculation means 3 calculate a value P2$bis$ for a movable boundary marker of a segment, using the following expression:

$$P2bis = (N2c + \Delta EGTrN2ant)/N2ld$$

in which $\Delta$EGTrN2ant represents the margin with respect to the EGT limit at an anticipated operating point RA, which is a projection at a particular period $\Delta t$ which is later than the current operating point RP, assuming that the engine maintains the same dynamics (that is, assuming the value dEGT/dN2 for the given moment, for instance, geometrically speaking, by following the tangent of C3 at RP); and the means 5 display the segments 18 and 19 on the dial of the gauge 11 of which the lower boundary markers are positioned on this value P2$bis$ (calculated in comparison with EGTlim and EGTmax respectively).

Figure 8:
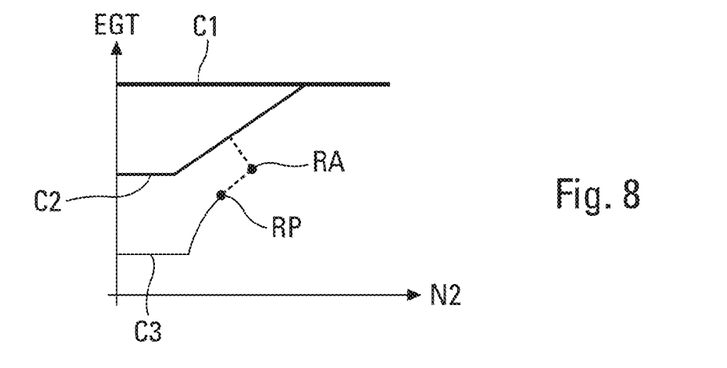

In this case, $\Delta$EGTrN2ant is calculated as indicated above for $\Delta$EGTrN2, albeit at the anticipated operating point RA as opposed to at the current operating point RP, as shown in FIG. 8.

This anticipated operating point RA, which is thus a projection $\Delta t$ seconds later than the current operating point assuming that the engine maintains the same dynamics (dEGT/dN2), is defined by the following coordinates:

$$((N2c + \Delta t \times dN2/dt)/(N2ld), (EGTc + \Delta t \times dEGT/dt)/(EGT\ max))$$

$\Delta t$ can be a set value, for example 3 seconds, which is provided to obtain an accurate anticipation, taking into account the crew response time and preventing an exaggerated response, such as the crew prematurely and unjustifiably switching off the engine.

However, $\Delta t$ can also be maximised (at $\Delta t$max) to prevent an incorrect overheating indication when the current operating point RP is approaching the EGT limit (curve C2 in FIG. 8). $\Delta t$max should be such that the anticipated operating point remains at the level of or below the EGT limit.

$\Delta t$max can be found using the following equation:

$$(dEGT/dt \times \Delta t\ max)^2 + (dN2/dt \times \Delta t\ max)^2 = (EGT\ int - EGTc)^2 + (N2int - N2c)^2$$

in which EGTint and N2$int$ correspond to the coordinates of the intersection of the curve indicating the EGT limit and of the tangent from the current operating point of the actual evolution curve.

Moreover, said calculation means 3 additionally calculate a value P3 for a lower movable boundary marker 33 of a segment 26, corresponding to a start limit which is so slow that there is a high probability of failure ("hung start", referred to as "HS slow start" below). The slowness threshold that makes start failure probable is specified by the engine manufacturers (generally as a minimum dN2/dt). Said means 5 display said segment 26 on the dial 15 of the gauge 11 between an upper boundary marker given by the value of P2 (position 16 or 17 on the dial 15 in FIG. 2) and a lower boundary marker given by the value of P3 (position 33 on the dial 15 in FIG. 2).

The calculation of P3 depends on the manner in which an HS slow start is monitored by a full-authority digital engine control (FADEC) system. More specifically:

a) if the monitoring is carried out solely by specification of a minimum value (dN2/dt)min in the FADEC system, this lower position P3 can be calculated using the following expression:

$$P3 = P1 - k2((dN2c/dt)c - (dN2/dt)min)$$

with k2 being an empirical adjustment factor to homogenize the equation and adjust the display, and (dN2/dt)c being the current time derivative of N2;

b) in some applications, for which an HS slow start is declared when dN2/dt is below a set threshold for a predetermined minimum period, the lower extremity P3 of the segment can be calculated using the following expression:

$$P3=P1-k3(Tmax-T)(dN2/dt)c$$

in which k3 represents an empirical adjustment factor, T corresponds to a timer expressed in seconds, incremented when the value for dN2/dt is insufficient or decremented when the value for dN2/dt is satisfactory, and Tmax is the maximum permitted value for the timer which characterizes a hung start.

Moreover, said calculation means 3 determine an additional value for the percentage to which start is complete, in relation to the opening of the fuel valve of the turbine engine, and said means 5 display a symbol or point of reference 34 (for example a dash with the indication "FF") on the dial 15 of the gauge 11, which is positioned at this value, as shown in FIG. 3.

This point of reference 34 to indicate on the gauge 11 the opening of the fuel valve indicates the position on the dial at which fuel is injected automatically under automatic start, or the position from which the crew can request fuel injection under manual start.

Moreover, in a particular embodiment, said calculation means 3 calculate an auxiliary value Paux for a movable boundary marker of a segment 35, corresponding to a windmill-start limit, and said means 5 display, for example in grey, a segment 35 on the gauge 11 of which the lower boundary marker is positioned on this auxiliary value (position 36), as shown in FIG. 7.

When the needle 14 is below this segment 35 (in grey, for example), the aeroplane has to be accelerated in order to increase the windmill rotational speed of the engine so as to be able to perform a windmill start.

The lower extremity 36 (auxiliary value Paux) of this segment 35 can be calculated as follows, depending on the manner in which the windmill-start limit is defined:
a) if the windmill-start limit is defined as being a minimum value N2$wm$, the lower extremity of this segment 35 is a set value, defined simply as:

$$Paux=N2wm/N2ld;$$

b) if the windmill-start limit is defined as being a minimum air speed (CASwm), the lower extremity of the segment 35 is movable and is calculated using the following expression:

$$Paux=P1+kwm\times(CASwm-CASc)/CASwm$$

in which:
kwm is an empirical adjustment factor; and
CASc is the current air speed value.

Moreover, text zones 24 and 25 are provided on the display means 7 to display messages of various types of message (text, symbols, etc.).

For example, textual data can be displayed in the text zone 24, in three lines, with:
a first line indicating the type of start (for example: windmill or starter-assisted; manual or automatic);
a second line indicating the state of start elements (for example: position of the start air valve, position of the fuel valve, power status of the igniter plugs); and
a third line indicating the current state of the engine and/or any outages.

Moreover, the text zone 25 may contain the digital value of N2$c$. Preferably, the needle 14 and the digital value thus displayed are both coloured according to the colour of the coloured segment in which the needle 14 is found.

Figure 9:
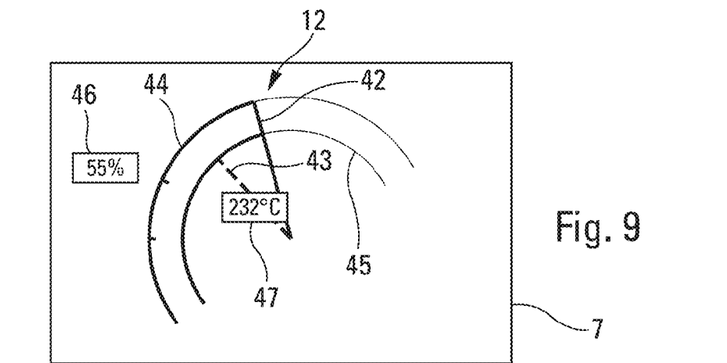
FIGS. 9 to 11 show a display according to a second embodiment of the invention for various states of the engine.
Figure 10:
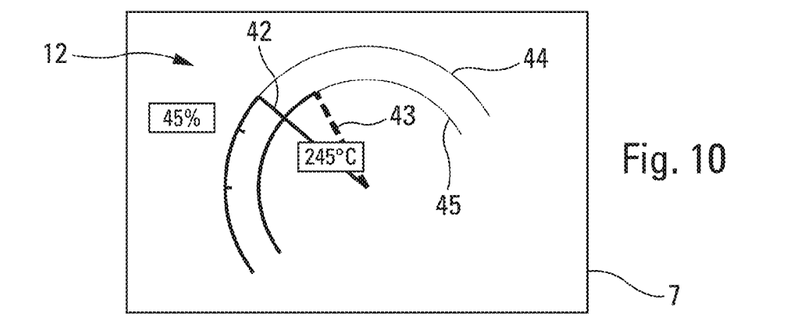

Moreover, in a second embodiment shown in FIGS. 9 to 11, said first and second indicating means of the gauge 12 correspond respectively to a first and a second needle 42 and 43 which are represented on two concentric dials 44 and 45, namely an outer dial 44 for said first needle 42 (shown as a continuous line) and an inner dial 45 for said second needle 43 (shown as a dashed line). The first needle 42 represents, as in the first preferred embodiment, a percentage to which start is complete, as represented by the parameter P1. The second needle 43 represents the EGT gas outlet temperature, and the scale on the inner dial 45 is variable and can be adjusted repeatedly in real-time such that the overheating limit value, known as the EGT limit, is always at the point at which said first needle 42 meets this inner dial 45.

Therefore, the accepted positions for the temperature needle 43 (second or inner needle) are those located below the current position of the start needle 42 (first or outer needle), as shown in the example in FIG. 9. When the two needles 42 and 43 are superposed, the overheating limit has been reached, and if the temperature needle 43 overtakes the start needle 42, the overheating limit has been breached and start must be stopped. To clearly show this breach, the display of the needle 43 can change colour and switch from a first colour, such as green, for a normal start (FIG. 9) to a second colour, such as red, for a start with overheating (FIG. 10). In FIGS. 9 to 11, the first colour is shown by way of a line of average thickness and the second by a thick line on the dial 45.

In FIGS. 9 to 11, the display zones 46 and 47 are also shown which indicate the current values for P1 (in %) and EGT (in ° C.).

Thus, it is very easy for an operator to discern a hot start (or a start which is drifting) by looking at the angular displacement and variations between the two needles 42 and 43.

When the needle 42 reaches the value N2$td$ as described in the first embodiment, the device 1 deems the engine to be idling, and artificially and gradually brings this needle 42 back to the maximum value to indicate that start is complete. In FIG. 11, start is complete, and the means 5 display an indication ("Avail", for example) to this effect in a zone 48. It is then possible to switch to a conventional display.

The invention claimed is:

1. A method for aiding the monitoring of a turbine engine of an aircraft while said turbine engine is in a sub-idle operating phase, according to which method the following operations are carried out automatically and repeatedly in real-time:
   a) receiving current values for a rotational speed (N2) of a high-pressure module of the turbine engine and for a gas outlet temperature (EGT) from the turbine engine;
   b) calculating a first parameter indicating as a percentage a state of completion of a start or a current state of the sub-idle operating phase, wherein the calculation is based on at least the current value for the rotational speed (N2) of the high-pressure module of the turbine engine;
   c) calculating at least one second parameter indicating a margin to a temperature limit for the turbine engine, wherein the calculation is based on at least the current value for the gas outlet temperature (EGT) from the turbine engine;
   d) calculating at least one third parameter indicating a margin to a start failure due to an insufficiently quick acceleration, wherein the calculation is based on at least a time derivative of the current value for the rotational speed (N2) of the high-pressure module of the turbine engine;

e) determining a correlation between said first and second parameters, and between said first and third parameters; and f) displaying a first indicating element, at least one second indicating element and at least one third indicating element on a same gauge of a display device, wherein the first indicating element represents the first parameter, the at least one second indicating element represents the second parameter, and the at least one third indicating element represents the third parameter, and adhere, among themselves, to the correlations determined in step e).

2. The method according to claim 1, wherein said first parameter is P1-and is calculated using the following expression:

$$P1=(N2c-N2t0)/(N2ld-N2t0) \text{ in which:}$$

N2c represents said current value for the rotational speed (N2) of the high-pressure module of the turbine engine;

N2t0 represents an initial value for the rotational speed (N2) of the high-pressure module of the turbine engine; and N2ld represents a target value for the rotational speed (N2) of the high-pressure module of the turbine engine while idling.

3. The method according to claim 1, wherein said first, second and third indicating elements correspond respectively to a needle which moves on a dial which is graduated in terms of the percentage to which start is complete, to a first movable boundary marker of a segment of this dial which represents an overheating limit, and to a second movable boundary marker of a segment of this dial which represents a hung-start limit.

4. The method according to claim 3, wherein the second parameter is P2 is calculated using the following expression:

$$P2=(N2c+k1 \times \Delta N2ant+(1-k1) \times \Delta EGTrN2)/ N2ld \text{ in which:}$$

N2c represents said current value for the rotational speed (N2) of the high-pressure module of the turbine engine;

ΔEGTrN2 gives the current margin with respect to the overheating limit, known as the EGT limit, at current operation;

ΔN2ant indicates an anticipated breach of the gas outlet temperature limit, at current dynamics;

N2ld represents a target value for the rotational speed of the high-pressure module of the turbine engine when idling, that is, at the end of the start phase or of an attempt to recover from sub-idle operation; and k1 is a coefficient of empirical adjustment between the anticipation term and the current margin term.

5. The method according to claim 4, wherein the margin ΔEGTrN2 is calculated using the following expression:

ΔEGTrN2 =ΔEGT1×N2ld in which ΔEGT1 is the difference between the current value for the gas outlet temperature from the turbine engine and the corresponding value for the curve indicating the EGT limit.

6. The method according to claim 4, wherein the margin ΔEGTrN2 is calculated using the following expression:

$$\Delta EGTrN2 =\Delta EGT 2\times N2ld$$

in which ΔEGT2 is the shortest distance between the current operating point and the curve indicating the EGT limit.

7. The method according to claim 4, wherein said value ΔN2ant is determined as a function of the current margin ΔEGTrN2 and, where this margin is positive, as a function of the dynamics of evolution in the gas outlet temperature (EGT) from the turbine engine and in the rotational speed (N2) of the high-pressure module of the turbine engine.

8. The method according to claim 4, wherein, in addition, an auxiliary movable boundary marker value is calculated for a segment of said dial and corresponds to a windmill-start limit, and a segment of which the lower movable boundary marker is positioned on this second auxiliary value is displayed on the dial of the gauge.

9. The method according to claim 4, wherein each segment of the dial is displayed in a specific colour, and in that the needle assumes the colour of the segment in which it is positioned.

10. The method according to claim 4, wherein an additional value is determined for a percentage to which start is complete, in relation to the opening of the fuel valve, and a symbol is displayed on the dial of the gauge and positioned over this additional value.

11. The method according to claim 3, wherein the first moveable boundary marker is P2bis which is calculated using the following expression:

$$P2bis =(N2c+\Delta EGTrN2ant)/N2ld \text{ in which:}$$

N2c represents said current value for the rotational speed of the high-pressure module of the turbine engine;

ΔEGTrN2ant is a margin which is determined at an anticipated operating point, assuming that the turbine engine maintains the same dynamics; and N2ld represents a target value for the rotational speed of the high-pressure module of the turbine engine when idling, that is, at the end of the start phase or of an attempt to recover from sub-idle operation.

12. The method according to claim 1, wherein auxiliary data are shown on said display.

13. A method for displaying information about a start operation or a sub-idle operation of a turbine engine of an aircraft, the method comprising:
receiving current value of a rotational speed of the turbine engine and a current value of a gas outlet temperature of the turbine engine;
calculating a first parameter indicative of a current state of completion of the start operation or the sub-idle operation, wherein the calculation of the first parameter is based on the current value of the rotational speed;
calculating a second parameter indicative of a current value of a temperature limit margin for the turbine engine, wherein the calculation of the second parameter is based on the current value of the gas outlet temperature;
calculating a third parameter indicative of a current value of a margin to a start failure due to slow acceleration, wherein the calculation of the third parameter is based on a time derivative of the current value of the rotational speed; and
generating a graphical image including icons representing each of the first, second and third parameters, wherein the graphical image shows a relationship between the first and second parameters, and between the first and third parameters.

14. The method of claim 13 wherein the steps of the method are performed repeatedly during the start operation or the sub-idle operation.

15. The method of claim 13, wherein the icon representing the first parameter appears as a needle on a dial gauge, the icon representing the second parameter appears as an arc on a circle segment defined by the needle, and the third parameter appears as a second arc on the circle segment.

16. The method according to claim 13, wherein the first parameter is P1 and is calculated using the following expression:

$$P1=(N2c-N2t0)/(N2ld-N2t0) \text{ in which:}$$

N2*c* represents the current value of the rotational speed;
N2*t*0 represents an initial value of the rotational speed, and
N2*ld* represents a target value for the rotational speed while the turbine engine is idling.

* * * * *